United States Patent [19]
Miura

[11] 3,750,364
[45] Aug. 7, 1973

[54] METHOD AND APPARATUS OF WRAPPING FOR ANNULAR GOODS

[76] Inventor: Isago Miura, 1-4-19, Honcho, Asaka-shi, Saitama-ken, Japan

[22] Filed: Nov. 15, 1971

[21] Appl. No.: 198,643

Related U.S. Application Data
[63] Continuation-in-part of Ser. No. 113,376, Feb. 8, 1971.

[52] U.S. Cl............ 53/13, 53/30, 53/204, 150/54 B, 206/46 T
[51] Int. Cl............ B65b 11/48
[58] Field of Search............ 53/13, 204; 206/46 T; 150/54 B

[56] References Cited
UNITED STATES PATENTS

| | | | |
|---|---|---|---|
| 3,085,373 | 4/1963 | Branick | 53/13 |
| 1,640,022 | 8/1927 | Angier | 53/13 X |
| 3,005,542 | 10/1961 | Harrison | 53/13 X |

*Primary Examiner*—Travis S. McGehee
*Attorney*—David S. Kane, John Kurucz et al.

[57] ABSTRACT

A method and an apparatus are provided for packing or wrapping annular articles automatically. A sheet of thermoplastic film tape is stretched in advance to eliminate folds and the outer side of the annular article is wrapped with this sheet in a circumferential direction. Both hems or marginal side edges across the width of the sheet join together at the inside of the annular article, and they are sealed in a ring shaped manner around the inside of the annular article.

9 Claims, 16 Drawing Figures

INVENTOR
ISAGO MIURA

3,750,364

METHOD AND APPARATUS OF WRAPPING FOR ANNULAR GOODS

CROSS REFERENCE TO RELATED APPLICATION

This application is a continuation in part of application Ser. No. 113,376 filed Feb. 8, 1971.

BACKGROUND OF INVENTION

1. Field of the Invention

This invention relates to a method and an apparatus for packing or wrapping an annular article.

2. Description of the Prior Art

Heretofore, wrapping of annular articles such as automobile tires, electric wires or the like was usually acheived by sequentially winding either a paper tape, plastic film or the like around the annular articles in a coiled partially overlapped fashion by hand. These methods have many disadvantages as mentioned below. The wrapping operation employing such a tape was generally accomplished by hand and was difficult to accomplish mechanically and required a considerable amount of time. In addition, these techniques imposed an unsightly or poor wrapper appearance in many cases and it was difficult to seal the article in an air or liquid tight manner.

It has been recently proposed, as discussed in the above referenced application, to impose upon a thermo-plastic film tape a shape which conforms with the surface of the annular article by stretching the film tape over a roller in a circumferential direction and then deforming the plastic to the selected contour. According to this method, when a processed sheet of material is applied for packing or wrapping, a specific annular article, it will possess the desire configuration, and it will be disposed about the article tightly.

However, in wrapping large numbers of annular articles with webs of long film tape drawn out from a delivery roll, problems have been encountered in covering the entire circumferences of the annular articles closely with the film and also in smoothing out crumpled film tape which would other wise form creases. Moreover, it was desirable to seal the seam of the film by means of heat sealing. However, up to the present, an optimum method of heat sealing has not been developed.

The seam is generally ring-shaped, and it has not been possible to adopt with complete satisfaction existing methods of heat sealing, as for example, by impulse heating, that is, by applying electric current pulses for a short time to heater, or by applying any ordinary hot iron to seal the seam or film; that is, by Joul heating which is conducted to a piece of thermal-conductive material or heat sealing by the method of induced electricity heating. These existing methods are not advantageously suited for sealing large quantities of seams in an efficient manner.

With the application of Joul heat for heat sealing, the heated film oftentimes adheres to the heater. In this connection, the molten film material is very adhesive in the absence of instant quenching. In regard to the induced electrical heating, the wrapping materials have a tendency to restriction.

This invention improves upon existing methods of the type disclosed in the above referenced application by eliminating the foregoing drawbacks by mechanically smoothing out crumpled or creased film and effectively heat sealing the wrapping and, moreover, by providing an essentially complete mechanical wrapping operation.

SUMMARY OF THE INVENTION

This invention is directed to a method and an apparatus for packing or wrapping an annular article by essentially automatic machinery, and more particularly, a method and an apparatus for packing or wrapping an annular article by first adhering an edge of the film tape which is initially formed into the configuration of the annular article in advance and which is supplied in a direction tangentially of the inner radius of the annular article to the outer surface of the article. At the same time, the central part of the width of the film tape is stretched to make a longer axial circuit than both side edges or hems while applying substantially equal tension across the width of the film as it is turned around the article to be covered. The film tape is cut at the prescribed location and both edges or hems of the tape are placed together along the inside edge of the annular article. Lastly, the edges or hems are heat sealed together with a sealer which conducts instant heat with instant quenching.

BRIEF DESCRIPTION ON THE DRAWINGS

DESCRIPTION OF THE PREFERRED EMBODIMENTS

Figure 1:
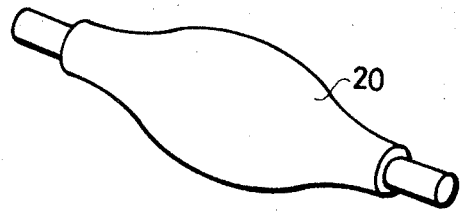
FIG. 1 is the perspective view illustrating the roller which is used to make the film tape into the configuration of an annular article to be wrapped.
Figure 2:
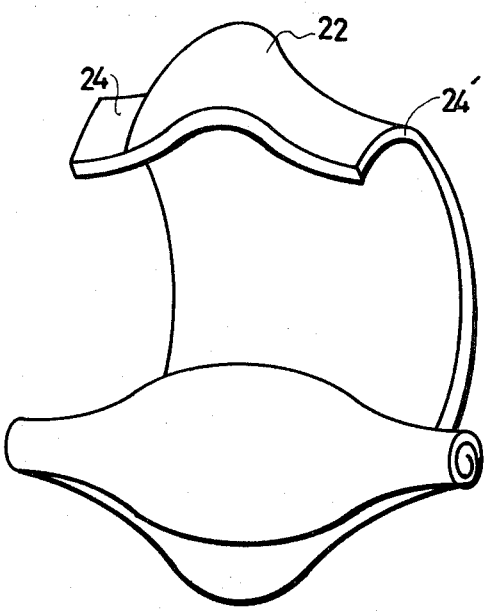
FIG. 2 is the perspective view illustrating the film tape made into the configuration of the annular article by the roller shown in FIG. 1.
Figure 3:
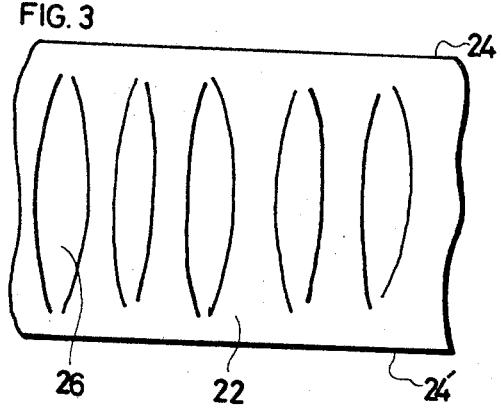
FIG. 3 is the plane view illustrating the film tape of FIG. 2.

In FIG. 1, the roller 20 is used for forming the planar film tape into the configuration of the specific annular article to be wrapped without applying any tensile force. In FIG. 2, the reference numeral 22 indicates the thermoplastic film tape made into the above mentioned configuration by being applied around the roller 20; and as shown in FIG. 3, both hems or marginal side edges of the width of the film tape are spread and stretched for wrapping the annular articles. The wrapping is conducted along the surface of the annular article by applying tension substantially equally upon both hems 24 and 24' and, to a lesser degree, on the central part folds 26. The film tape 22 made into this configuration has been utilized in the past as mentioned below for packing or wrapping.

Figure 4:
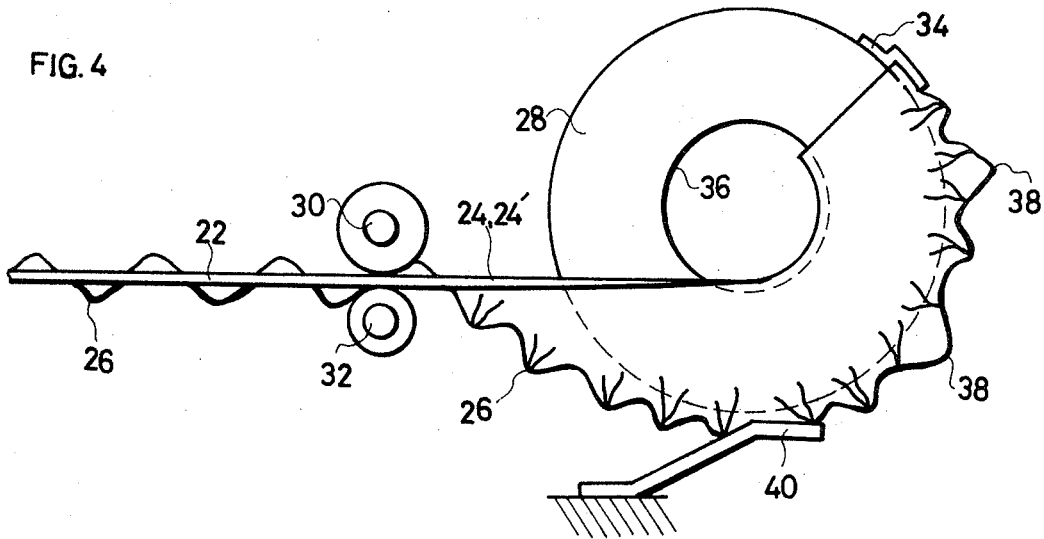
FIG. 4 is a side elevation view illustrating the existing apparatus of the above referenced application to wrap or to pack the annular article with the film tape shown in FIGS. 2 and 3.

Thus, in FIG. 4, 28 indicates the annular article, 22 is the film tape, 26 its folds, and 24 its hems. The film tape 22 is drawn out and passed through the guide consisting of rollers 30 and 32. The leading end of the tape is adhered to the surface of the annular article 28 with adhesive tape 34 and the annular article 28 is turned around its axis in a counter clockwise direction as shown. With the rotary motion of the annular article 28, the film tape 22 is drawn around the outer surface of the annular article 28 and the tension is concentrated at both hems 24 and 24', not necessarily on the center of the film tape 22.

Therefore, both hems 24 and 24' of the film tape 22 are to wrap around the inside surface 26 of the annular article 28 under tension. However, the central part comprising folds 26 is not stretched perfectly, and as a result, convex pleats 38 remain. In order to eliminate these pleats 38 of the film and also in order that the central folded part 26 of the film tape 22 covers the annular article 36 tightly, a roller or alternatively scoop 40 has heretofore been provided. However, it has been entirely impossible to eliminate pleats 38 by such means. The present invention provides a method of packing or wrapping an annular article which eliminates such folds, pleats or creases.

Figure 5:
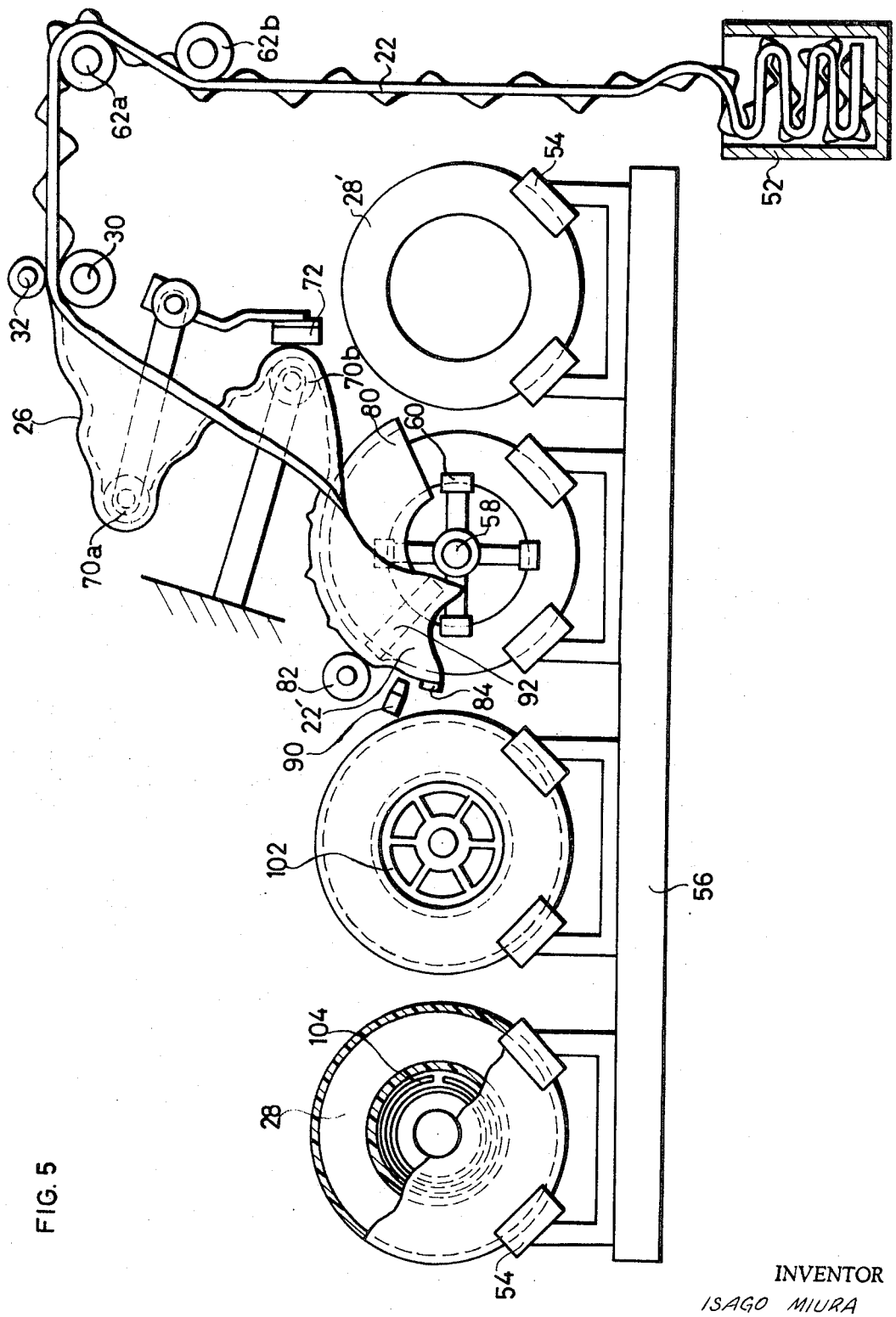
FIG. 5 is a side elevation view illustrating apparatus of present invention to wrap or to pack an annular article with the film tape shown in FIGS. 2 and 3.

Thus, in FIG. 5, reference numeral 50 indicates an automatic packing or wrapping machine which solves the problems of prior art wrapping machines. A case 58 of the film tape 22 is provided by the side of the machine 50. The automatic packing or wrapping machine 50 can be divided functionally into four parts or stages. First, from the right, the first stage supplies film tape, the second stage performs the wrapping, the third stage prepares the applied wrapper and the fourth stage cuts the applied and prepared wrapper. All annular articles 28 are initially supplied to stand 54 of the first stage. The above mentioned annular articles 28 to be wrapped and supplied to each stage are transferred by a feed bar 56 traversing a vertically and also horizontally reciprocal motion. The mechanism for accomplishing this motion would be readily apparent to those skilled in the art; and the details thereof will not be disclosed for the sake of brevity.

Suffice it to say that at the first stage, the annular article 28' being supplied to this stage is carried down by the feed bar 56 and then it is carried to the second stage at which the annular article 28' is elevated. The annular article 28' is clamped by the clutch 60 which can open and close in radial direction any known mechanical motion such as that afforded by a linkage mechanism (not shown). The feed bar 56 descends down and returns to its original position. The reference numeral 58 indicates the shaft of the clutch 60.

At the second stage the annular article 28 is wrapped with the film tape 22. The web of the long sheet of film tape 22 which is housed in and drawn out of the case 52 passes through the roller 62a and 62b; and the web is passed around member 70a and 70b for stretching so that the film tape 22 has imparted thereto equal tension on each part across its width. The tension upon the film tape 22, especially upon the central part of its width is controlled by regulated brake 72. Therefore, the film tape 22 covers the outer surface of the semicircular-shaped hollow cover 80. The film tape passes over the surface of the cover 80 without any folds 26 and eventually arrives at the trailing edge of the cover 80. After that, the film tape is held at that position in a stand-by condition by cover 80 and the roller 82 which upon rotation cooperates in drawing tape 22 out from the case 52. When the annular article 28 is clamped at a fixed position, the roller 82 starts rotating automatically to draw out or pull the film tape 22. The leading edge 22' of the film tape 22 is held closely on the surface of the annular article 28 with a clamp 84. At the same time, rotation is imparted to shaft 58 and rotation of the annular article 28 commences while the clamp 84 holds leading edge 22'. Thus, clamping relation need only be maintained for part of the rotary cycle of the article 28 because the film 22 adheres closely to the annular article 28 without any looseness because of the nature of the formed plastic film. In a successful embodiment of the invention the clamp remains activated for approximately half the cycle and returns to its original position. As stated, although the clamp 84 leaves the surface of the annular article 28 and returns to its original position, the film tape 22 is still adhered to the surface of the annular article 28. The annular article completes one revolution and then stops. At this juncture the leading and trailing edges of the film tape 22 overlap each other in their longitudinal direction. Then the sealer 90 touches the film tape 22 at the overlapped part, and the overlapped edges are heat sealed. At the same time, the film tape 22 is cut near the edge of the cover 80 by supplying electricity for a short time to the bare nicrome wire 90. The operations of the second stage are now completed.

The feed bar 56 is actuated and rises; clutch 56 is unclamped and any rotation of annular article 28 is prevented by deactuating shaft 58 and clutch 60. The annular article 28 covered with the film tape 22 is transferred to the feed bar 56 which descends, shifts to the left and rises at the third stage.

Figure 6:
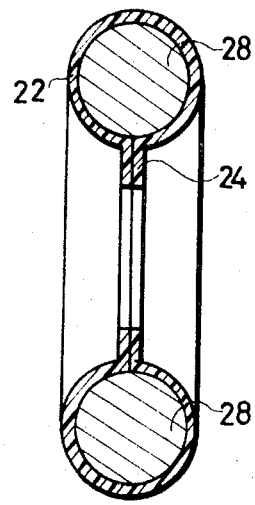
FIG. 6 is a section illustrating the annular article being wrapped with the film tape.

At the third stage, the edges or the hems are concentrated and arranged in superimposed relationship along the inside circumference of the annular article 28 for heat sealing at the fourth stage. Accordingly, any irregularities of the hems 24 of the film tape 22 is incidental to the rotary motion at the second stage, and are removed as shown in FIG. 6. For this purpose, a ring shaped wire 102 is inserted interiorly of the annular article.

Figure 7:
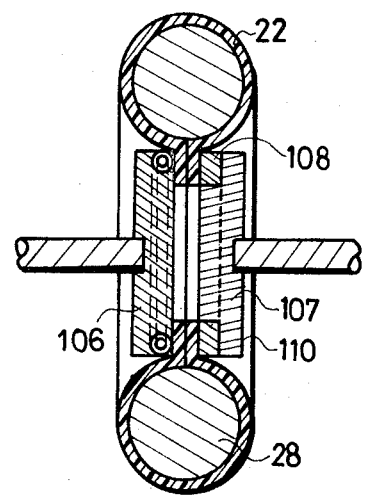
FIG. 7 is a section illustrating the structure of the present invention for heat sealing of the seam of the film tape which wraps the annular article.

Referring now to the fourth stage at which the hems 24 are sealed, it will be observed that the annular article is held in a fixed position after having been deposited there by feed bar 56. The heat sealing apparatus 110 at this station in the FIG. 7 is automatically actuated and the hems 24 of the film tape 22 are heat sealed thereby. (See FIG. 7). When the heat sealing is completed, a mechanical circular blade 104 is used to cut the hem of the film tape 22 in the form of a concentric circle within the interior of the annular article. The cutting of the film tape 22 with the circular blade 104 is preferably accomplished by turning the blade 104 relative to the hem 24. Thus the packing or wrapping of the annular article 28 is now completed. The completely wrapped annular article is then removed from the stand 54 of the feed bar 56. The wrapped annular article 28 may be rolled out to the left side from the feed bar 56 by lowering the left leg (in FIG. 5) of the stand 54 when the feed bar 56 is lowered. It should be understood that annular articles will be present at each station of the automatic machine 50, each being acted upon in succession as described above.

Figure 15:
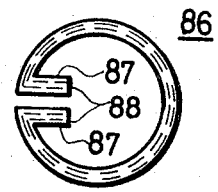
FIG. 15 is the plane view illustrating the pipe of the heat seal structure of the present invention.

FIG. 7 indicates a preferred embodiment for heat sealing the part 24 shown in FIG. 6. Circular plates 106 and 107 are of a size corresponding in size and diameter to the internal surface of the annular article 28. In this embodiment, the circular plate 106 is of thermostable ceramics (super alumina ceramics) and the circular plate 107 is made of an ordinary iron material. The coil 86 in FIG. 7 is shown in elevation in the FIG. 15 and may be made of stainless steels, nicrome wires, steel, nickel, compound metals, or the like. The opposed end edges 87 of the coil 86 are connected to an electric source (not shown). The coil may be hollow having openings 88 transmitting a medium in and out of the coil for cooling such as air, water or the like. The coil 86 is set in a peripheral groove on the circular plate 106. Packing 108 is a thermostable cushion which is constructed to correspond in size to the opposed coil 86. As a suitable material, silicone rubber or silicone rubber sponge may be applied for this packing.

The heat sealing apparatus shown in FIG. 7 will now be described. Between the circular plates 106 and 107, both hems 24 and 24' of the film tape 22 are inserted. Next, from the edges 87 of the coil 86, sufficient electric power is supplied to both, heating the coil 86 somewhat instantly. When the calorific value is sufficient and necessary for heat sealing, the supply of the electric power is turned off and a medium such as air or the like for cooling is passed through the coil 86. When applying water for cooling, compressed air may be employed to instantly remove the water before the next heating cycle begins.

In case of a stainless steel coil 86 and of tubing 250mm in diameter, outside diameter 2.5mm and inside diameter 2.1mm, the two overlapped hems 24 to be heat sealed are 0.1mm thick made of the material such as polyethylene, the electric power to be supplied for heat sealing is sufficient at 30V,AC of 1.5 seconds duration. It is possible to heat seal and heat cut at the same time. It is also possible to apply the heater for only heat sealing and another heater for cutting only by arranging them in a row of a concentric circle, or, by connecting two pipes of different size with each other or by making two pipes of different metals, which have their own respective selected electric resistance, into one pipe.

Figure 16:
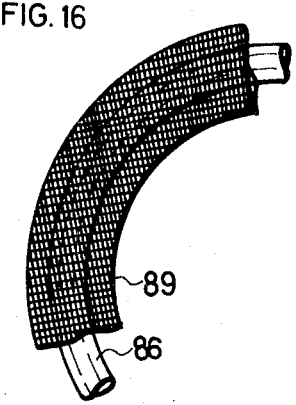
FIG. 16 is the enlarged view illustrating another embodiment of the pipe as in FIG. 15.

FIG. 16 indicates wire netting 89 on the surface of the coil 86. This netting is effective to buffer or counteract any sudden heating.

Figure 8:
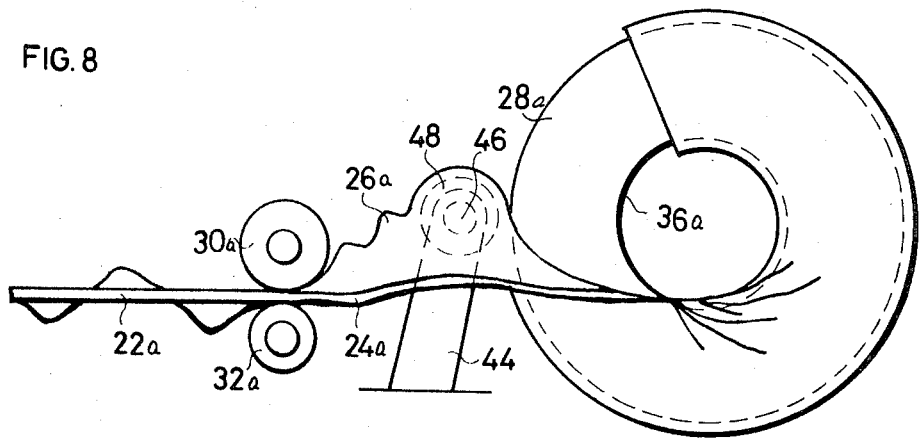
FIG. 8 is a section illustrating the first part of the structure of the present invention use for stretching the film tape to smooth out the crumpled sheet.
Figure 9:
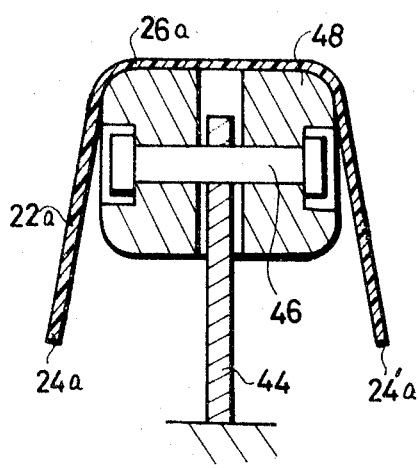
FIG. 9 is a section of the roller in FIG. 8.

In FIG. 8 the details of another embodiment of apparatus for stretching and folding are shown. Reference numeral 28 a indicates the annular article to be wrapped, 22a indicates the film tape drawn tangentially of the inner periphery 36 a of the annular article 28, 30a and 32a indicate guide rollers and 44, 46, and 48 indicate parts of the assembly for stretching folds shown in detail in FIG. 9. Supporting lever 44 is disposed between annular article 28a and the guide rollers 30a and 32a. Axle 46 extends laterally at the top of the lever 44. A pair of rollers 48 are supported symmetrically on the axle 46 and are freely rotatable thereon. These rollers 48 stretch folds 26a on the film tape 22a. Equal tension is imparted to folds 26 and both hems 24a and 24'a of the film tape 22a by each roller 48 constructed to have rounded corners and smooth surface.

As shown in FIG. 8, the film tape 22a will initially pass through the guide rollers 30a and 32a. Equal tension is imparted to the folds 26 and the both hems 24a and 24'a by the assembly of FIG. 9 for stretching folds. Hems 24a and 24'a pass over and in close proximity to the inside of the annular article 28a and the stretched fold 26a extends around the outer surface of the annular article 28a. In other words, the film tape 22a assumes the shape of annular article and with equal tension across the width of the film tape, the tape covers the surface of the annular article 28a closely.

Figure 10:
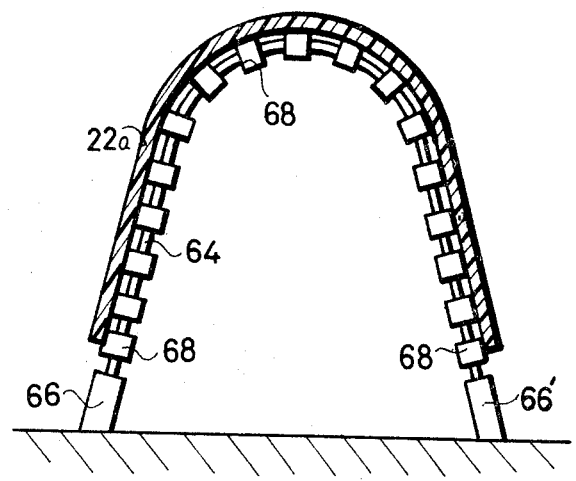
FIG. 10 is a section of another embodiment of the roller in FIG. 9.

FIG. 10 indicates an alternative preferred embodiment of the fold stretching mechanism. The horseshoe-shaped and curved shaft 64 extends from supports 66 and 66'. Miniature bearings 68 are on this curved shaft 64 to conduct the stretching of folds from the film tape 22a'. Instead of the bearings, a small roller may be inserted on the curved shaft 64 or a simple guide frame may be used to stretch folds 6 of the film tape 22'a.

Figure 11:
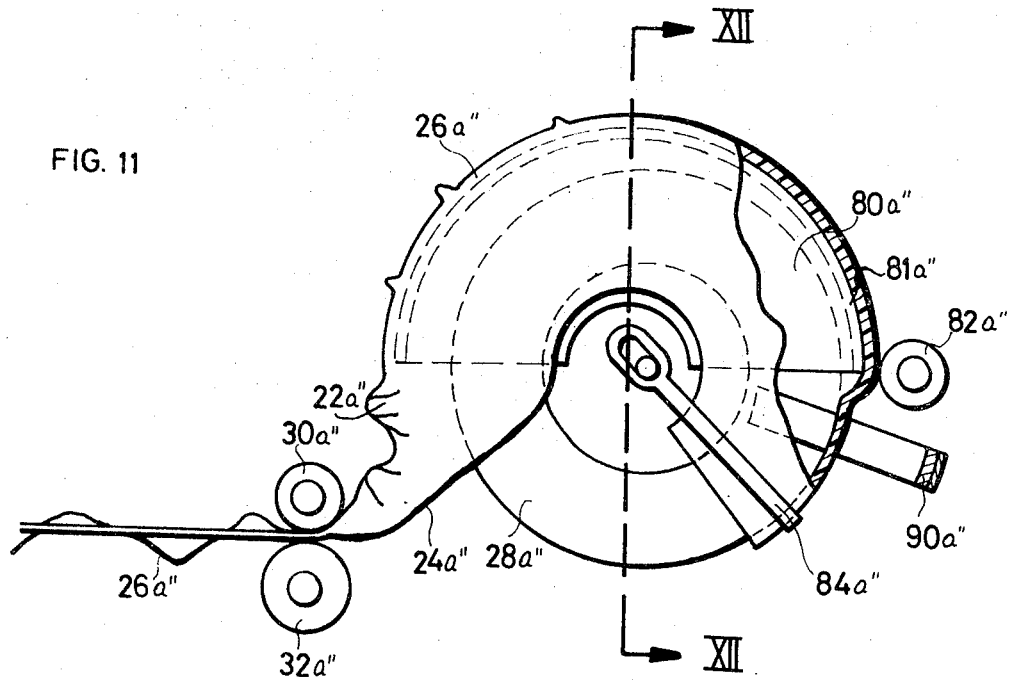
FIG. 11 is a section of the second part of the structure of the present invention used for stretching the crumpled film tape.
Figure 12:
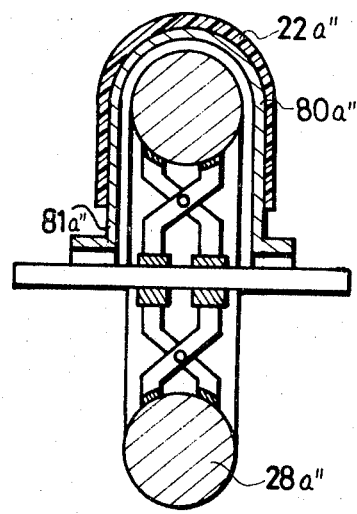
FIG. 12 is a section taken along the line XII—XII in FIG. 11.

In the embodiment of the invention of FIG. 11, film tape 22"a is drawn out in a tangential direction and over the outer surface of the annular article 28"a. This tape is stretched along the curved cover 80 "a surface and by sliding it on the surface, equal tension is induced. The cover 80 "a is along the surface of the annular article 28"a and is close to its outer surface. Cover 80"a is U-shaped accommodating therein the annular article (see FIG. 12). The leading edge of the film tape 22"a is attached to the surface of the annular article 28"a by clamp 84 prior to rotation, at a location at which the film tape 22"a passes over the cover 80"a. Then the annular article 28 is rotated and the film tape 22"a is drawn to pack or wrap the annular article 28"a. The groove cover 80" may be processed on its outside surface in order to reduce friction as much as possible and towards this end may be coated with Teflon or the like.

Figure 13:
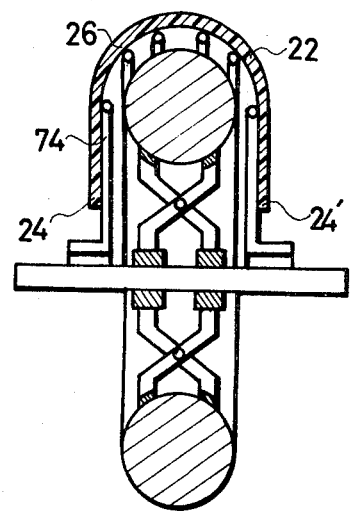
FIG. 13 is a section of another embodiment of the structure use for stretching as in FIG. 11.
Figure 14:
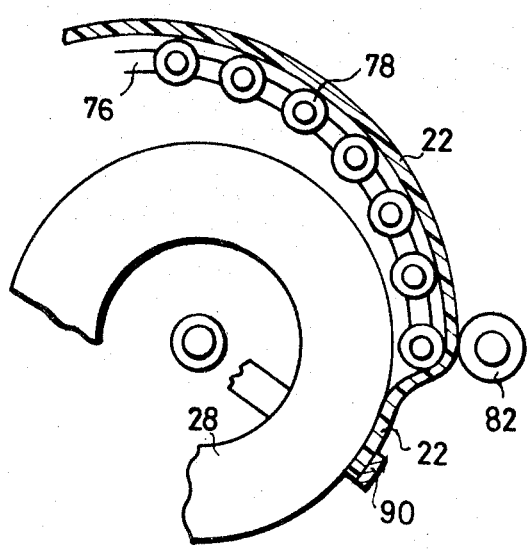
FIG. 14 is a side sectional view of FIG. 13.

The film tape 22"a is drawn and slid along the surface of the cover 80"a and induces equal tension across the width of the tape to reduce any folds on the surface of the film tape 22"a. The clamp 84"a rotates one complete turn and cooperating with sealer 90 cuts the film tape 22"a. At the same time, the overlapped edges of the film tape 22"a are heat sealed at 80. The reference numeral 82"a indicates the roller for drawing out and supporting the film tape 22. The size of the circle of the cover 80"a is not limited to that shown in FIG. 11 and it may be either longer or shorter as the situation may dictate. The embodiment shown in FIG. 13 incorporates several bow-shaped bars 74 or the like. While the film tape 22'''a is slid on the curved surface of bars 74, it is stretched. In FIG. 14 several bow-shaped tapes are arranged in a row and several miniature bearings 78 are provided on each for rotation. The film tape 22 slightly touches the exterior of bearing 78 to stretch its folds.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A method of packing or wrapping an annular shaped article with thermo-plastic film tape formed to the shape of said annular article comprising the steps of: providing film tape having folds thereon, stretching the central part of the tape to eliminate the folds of said film tape, wrapping said annular article with said stretched film tape while maintaining substantially equal tension across the tape so as to provide superimposed hems and heat-sealing the hems of said film tape.

2. A method in accordance with claim 1, comprising the steps of supplying said film tape in a tangential direction relative to said inner radius of said annular article and directing the center of the width of said film tape along the center of the annular article by rollers at the location between said annular article and a film supply location.

3. A method in accordance with claim 1, comprising the steps of supplying the said film tape in a tangential direction relative to the outer radius of said annular article and stretching said film tape over a saddle shaped cover so that said film tape is stretched with equal tension across its width.

4. A method in accordance with claim 3 wherein said saddle shaped cover extends partially over said annular article and has U-shaped cross section, and is of a size to contain said annular article therein.

5. A method in accordance with claim 1 comprising the steps of: providing a hollow coil, heating said coil by electricity, contacting the hems of said film tape with said coil to heat seal the hems and cooling said coil after heating by conducting a cooling medium through said coil.

6. An apparatus for packing or wrapping an annular shaped article with thermo-plastic film tape formed to the shape of said annular article comprising: a device to supply said film tape, a stretching device to eliminate folds of said film tape, a device for wrapping said annular article with said stretched film tape, a sealer for heat-sealing the hems of said film tape and a device to transport said annular article from one stage of the wrapping process to another.

7. An apparatus in accordance with claim 6 comprising: a roller to supply said film tape in a tangential direction relative to the inner radius of said annular and a roller to push the center of the width of said film tape to the center of said annular at a location between said film supplying said annular article.

8. An apparatus in accordance with claim 6 comprising: a saddle shaped cover having a U-shaped cross section which partially covers said annular article and is of a size that said annular article is contained in it.

9. An apparatus in accordance with claim 6 comprising a coil made of material that generates heat by conduction of electricity and is hollow for conducting a cooling medium in order to cool it instantly after heating.

* * * * *